United States Patent
White et al.

(10) Patent No.: US 9,672,270 B2
(45) Date of Patent: Jun. 6, 2017

(54) SYSTEMS AND METHODS FOR AGGREGATION, CORRELATION, DISPLAY AND ANALYSIS OF PERSONAL COMMUNICATION MESSAGING AND EVENT-BASED PLANNING

(71) Applicant: Zuess, Inc., San Francisco, CA (US)

(72) Inventors: Brandon Christian White, Easton, MD (US); William Thomas Code Cubit, Silver Spring, MD (US); Filip Perich, Annapolis, MD (US); Layne Wesley David Verbeek, Toronto (CA)

(73) Assignee: Zuess, Inc., San Francisco, CA (US)

( * ) Notice: Subject to any disclaimer, the term of this patent is extended or adjusted under 35 U.S.C. 154(b) by 465 days.

(21) Appl. No.: 14/025,354

(22) Filed: Sep. 12, 2013

(65) Prior Publication Data

US 2014/0074952 A1    Mar. 13, 2014

Related U.S. Application Data

(60) Provisional application No. 61/700,133, filed on Sep. 12, 2012, provisional application No. 61/700,627, filed on Sep. 13, 2012.

(51) Int. Cl.
*G06F 15/16* (2006.01)
*G06F 17/30* (2006.01)
(Continued)

(52) U.S. Cl.
CPC .. *G06F 17/30598* (2013.01); *G06F 17/30684* (2013.01); *G06Q 10/107* (2013.01); *H04L 51/36* (2013.01)

(58) Field of Classification Search
CPC   G06Q 10/107; G06Q 10/109; H04L 12/1813; G06F 3/083; G06F 17/30684
(Continued)

(56) References Cited

U.S. PATENT DOCUMENTS

| 7,013,299 B1 | 3/2006 | Sherwood |
| 8,390,670 B1 * | 3/2013 | Gottlieb ................... H04N 7/15 348/14.08 |

(Continued)

OTHER PUBLICATIONS

International Search Report and Written Opinion of the International Searching Authority for PCT/US2013/059462; mailed Apr. 7, 2014.

(Continued)

*Primary Examiner* — Viet Vu
*Assistant Examiner* — Michael A Chambers
(74) *Attorney, Agent, or Firm* — Cooley LLP

(57) ABSTRACT

A non-transitory processor-readable medium storing code to cause a processor to receive, from a first electronic device via a first mode, a signal representing a first data set associated with a first communication at a first time. The code causes the processor to define a second data set associated with the communication in a second mode. The code causes the processor to send a signal representing the second data set to a second electronic device at a second time after the first time. The code causes the processor to receive, from the second electronic device via the second mode, a signal representing a third data set associated with a second communication, at a third time after the second time. The code causes the processor to send, to the second electronic device, a signal including an instruction to present, on a display, the second data set with the third data set.

16 Claims, 8 Drawing Sheets

(51) Int. Cl.
*H04L 12/58* (2006.01)
*G06Q 10/10* (2012.01)

(58) Field of Classification Search
USPC .................. 709/204, 206; 707/776; 715/753
See application file for complete search history.

(56) References Cited

U.S. PATENT DOCUMENTS

| | | | |
|---|---|---|---|
| 8,621,653 B2 | 12/2013 | Khosravy et al. | |
| 9,076,125 B2 | 7/2015 | Manolescu et al. | |
| 9,400,972 B2 | 7/2016 | McKee et al. | |
| 2002/0111887 A1 | 8/2002 | McFarlane et al. | |
| 2002/0178161 A1 | 11/2002 | Brezin et al. | |
| 2003/0236835 A1* | 12/2003 | Levi | H04L 12/1813 709/204 |
| 2004/0267887 A1* | 12/2004 | Berger | G06Q 10/109 709/206 |
| 2007/0061330 A1 | 3/2007 | Newton et al. | |
| 2007/0136245 A1 | 6/2007 | Hess et al. | |
| 2008/0147639 A1 | 6/2008 | Hartman et al. | |
| 2008/0276179 A1 | 11/2008 | Borenstein et al. | |
| 2009/0180602 A1* | 7/2009 | Ramanathan | H04M 3/42374 379/211.02 |
| 2009/0319918 A1* | 12/2009 | Affronti | G06F 3/038 715/753 |
| 2009/0327428 A1* | 12/2009 | Ramanathan | G06F 15/16 709/206 |
| 2010/0100809 A1* | 4/2010 | Thomas | H04Q 3/0062 715/235 |
| 2010/0287048 A1* | 11/2010 | Ramer | G06Q 30/02 705/14.46 |
| 2010/0318400 A1 | 12/2010 | Geffen et al. | |
| 2010/0318410 A1 | 12/2010 | Lee | |
| 2011/0055264 A1* | 3/2011 | Sundelin | G06Q 10/107 707/776 |
| 2011/0066682 A1* | 3/2011 | Aldunate | H04L 67/36 709/204 |
| 2011/0141974 A1* | 6/2011 | Lieberman | H04L 12/5895 370/328 |
| 2011/0307403 A1 | 12/2011 | Rostampour et al. | |
| 2013/0003710 A1* | 1/2013 | Adams | H04W 88/06 370/338 |
| 2013/0017862 A1* | 1/2013 | Lee | H04W 60/005 455/558 |
| 2013/0024521 A1* | 1/2013 | Pocklington | H04L 51/16 709/206 |
| 2013/0073423 A1* | 3/2013 | Allen | G06Q 30/02 705/26.8 |
| 2013/0080917 A1* | 3/2013 | Levien | H04L 67/36 715/753 |
| 2013/0109302 A1* | 5/2013 | Levien | H04M 7/0024 455/39 |
| 2013/0132138 A1 | 5/2013 | Doganata et al. | |
| 2013/0143521 A1 | 6/2013 | Hernandez et al. | |
| 2013/0282844 A1 | 10/2013 | Logan et al. | |
| 2014/0047458 A1* | 2/2014 | Li | H04M 1/72525 719/315 |
| 2014/0074843 A1 | 3/2014 | White et al. | |
| 2014/0324854 A1 | 10/2014 | Isaacs et al. | |

OTHER PUBLICATIONS

Office Action dated Sep. 16, 2016 for U.S. Appl. No. 14/025,363.

* cited by examiner (Receiver Modality X)

(Receiver Modality X)

SYSTEMS AND METHODS FOR AGGREGATION, CORRELATION, DISPLAY AND ANALYSIS OF PERSONAL COMMUNICATION MESSAGING AND EVENT-BASED PLANNING

CROSS-REFERENCE TO RELATED APPLICATIONS

This application claims priority to and the benefit of U.S. Provisional Patent Application Ser. No. 61/700,133 entitled "Systems and Methods for Aggregation, Correlation, Display and Analysis of Personal Communication Messaging and Event-Based Planning," filed Sep. 12, 2012, the disclosure of which is incorporated herein by reference in its entirety.

This application also claims priority to and the benefit of U.S. Provisional Patent Application Ser. No. 61/700,627 entitled "Systems and Methods for Dynamic Analysis, Sorting, and Active Display of Semantic-Driven Reports of Communication Repositories," filed Sep. 13, 2012, the disclosure of which is incorporated herein by reference in its entirety.

BACKGROUND

Embodiments described herein relate generally to organizing, displaying, and/or analyzing online communication records, and, more particularly, to systems and methods for managing multiple communication accounts, aggregating, correlating, and analyzing the communication data associated with the accounts, and drawing information from the data.

Typically, a large number of emails, instant messages, short messages, voice messages, voice conferencing, video conferencing, and other one-to-one, one-to-many, and many-many communication modes exist within the context of Internet, telephony, and mobile based platforms. Each communication mode (e.g., modality) offers an alternate method and/or format for conversing with other people using audio, video, and/or text based communication channels. As is often the case, people can have several email accounts and/or telephone numbers (mobile or landline) that can be related to personal, professional, or organizational activities. In addition to the email accounts and telephone numbers, some people have multiple social networking accounts, such as Twitter®, Facebook®, LinkedIn®, MySpace®, etc. as well as other application specific accounts. Most of these modalities of communication, however, do not allow for cross-platform or inter-modality transfer (e.g., communications). For example, in some instances, a user of an electronic device such as a mobile phone may not be able to view and/or maintain a history of text messages and view and/or maintain a history of Facebook® conversations with another user in one location. Consequently, it can be difficult to keep track of both personal communications as well as difficult to determine and/or remember context to a particular communication thread.

Accordingly, a need exists for aggregating, correlating, analyzing, and displaying various communications (e.g., conversations) in a persistent dialog that is organized by relationships in a usable manner.

SUMMARY

Systems and methods for aggregating, correlating, analyzing, and displaying various, though related, communications (e.g., conversations) in an organized, usable manner are described herein. In some embodiments, a non-transitory processor-readable medium storing code representing instructions to be executed by a processor includes code to cause the processor to receive, from a first electronic device in communication with a network and via a first communication mode, a first signal. The first signal is associated with a first data set associated with a communication at a first time. The communication at the first time being associated with a conversation. The code includes code to cause the processor to define a second data set that is associated with the communication at the first time in a second communication mode. The code causes the processor to send, at a second time after the first time and to a second electronic device in communication with the network, a second signal that is associated with the second data set. The code causes the processor to receive, from the second electronic device via the second communication mode, a third signal that is associated with a third data set associated with a communication at a third time after the second time. The communication at the third time being associated with the conversation. The code causes the processor to send, to the second electronic device, a fourth signal. The fourth signal includes an instruction to present, on a display of the second electronic device, the second data set with the third data set.

DETAILED DESCRIPTION

Figure 1:
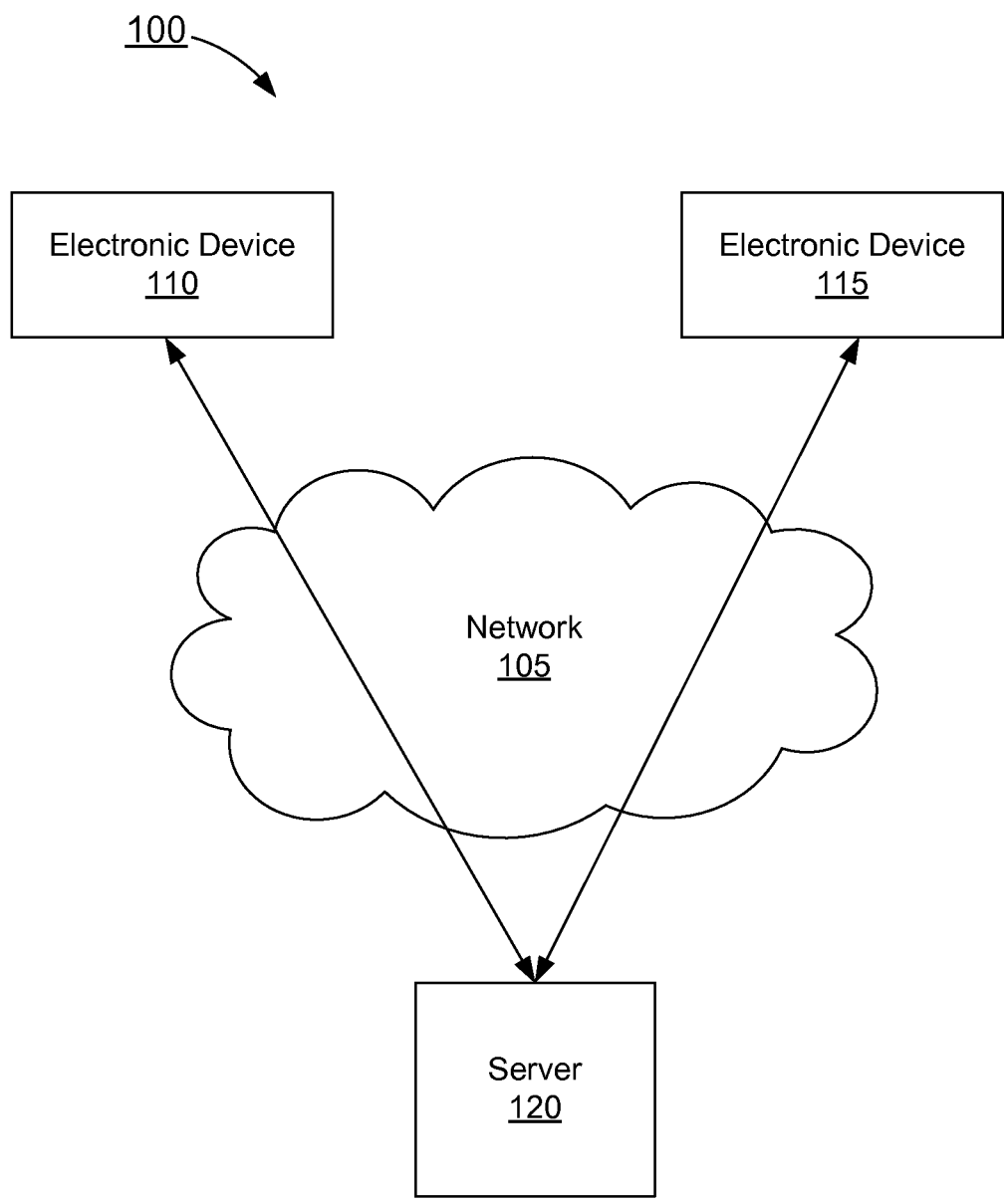
FIG. 1 is a schematic illustration of a communication system according to an embodiment.

In some embodiments, a non-transitory processor-readable medium storing code representing instructions to be executed by a processor includes code to cause the processor to receive, from a first electronic device in communication with a network and via a first communication mode, a first signal. The first signal is associated with a first data set associated with a communication at a first time. The communication at the first time being associated with a conversation. The code includes code to cause the processor to define a second data set that is associated with the communication at the first time in a second communication mode. The code causes the processor to send, at a second time after the first time and to a second electronic device in communication with the network, a second signal that is associated with the second data set. The code causes the processor to receive, from the second electronic device via the second communication mode, a third signal that is associated with a third data set associated with a communication at a third time after the second time. The communication at the third time being associated with the conversation. The code causes the processor to send, to the second electronic device, a fourth signal. The fourth signal includes an instruction to present, on a display of the second electronic device, the second data set with the third data set.

In some embodiments, a method includes receiving, at a host device via a network, a first signal associated with a communication from a first electronic device to a second electronic device. A user preference associated with a user of the second electronic device is verified. The user preference is associated with a communication mode. A second signal associated with the communication is sent to the second electronic device via the communication mode. A third signal is received at the host device via the network. The third signal is associated with a response to the communication from the second electronic device to the first electronic device. A fourth signal associated with the response to the communication is sent to the first electronic device.

In some embodiments, a non-transitory processor-readable medium storing code representing instructions to be executed by a processor includes code to cause the processor to receive a signal associated with an initial instance of data associated with a communication from a user of an electronic device to a user of a set of electronic devices. The code causes the processor to select a set of communication modes associated with the user of the set of electronic devices. The code causes the processor to define a set of instances of the data associated with the communication based on the initial instance of the data. Each instance of the data from the set of instances of the data is associated with a different communication mode from the set of communication modes. The code causes the processor to send a different signal from a set of signals to each electronic device from the set of electronic devices. Each signal from the set of signals is associated with a different instance of the data and is sent via the communication mode from the set of communication modes associated with that instance of the data. The code causes the processor to receive a signal associated with an indication that data associated with a first instance of the data from the set of instances of the data associated with the communication has been accessed via an electronic device from the set of electronic devices. The code causes the processor to send a signal to at least one electronic device from the set of electronic devices to remove a portion of data associated with a second instance of the data from the set of instances of the data.

In some embodiments, a message originated by a first user of any number of electronic devices can be sent to a second user of any number of electronic device (e.g., similar to or different than the devices used by the first user) by sending the message to multiple of the second user's communication channels (email, instant messenger, SMS, MMS, specific site messenger interfaces, voicemail, etc.), and after retrieval by the second user from one or more channels, the unused messages from other channels are deleted. The systems and methods enable a first user to reach a second user quickly and efficiently by ensuring that whichever communication modality may be in use at a given time by the second user is guaranteed to receive a message. Furthermore, the second user will not be bothered by duplicate messages sent to their other communication modalities because the duplicate messages are automatically removed immediately upon the second user viewing the message for the first time.

As used in this specification, the singular forms "a," "an" and "the" include plural referents unless the context clearly dictates otherwise. Thus, for example, the term "a module" is intended to mean a single module or a combination of modules.

As used herein, the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

Various terms are used herein and in the appended claims to describe, for example, various parts, portions, layers, etc. of an interaction between a user of an electronic device and a user of a different electronic device. For example, the terms "communication" and "message" can be used interchangeably and refer generally to data being sent, in substantially one direction, from a user of an electronic device to a user of another electronic device. By way of example, a communication or message from a user of a first electronic device to a user of a second electronic device can be an email, a voice message, an instant message (IM), an SMS, and/or the like, as described herein. A response to the email from the user of the second electronic device to the user of the first electronic device can similarly be referred to as a communication or message. Moreover, the term "conversation" used herein refers generally to a one or more communications or messages between users of different electronic devices. For example, an original email and a response to an email can be considered a conversation.

As used herein, the terms "modality," "communication mode," and "channel" can be used interchangeably and refer generally to one or more modes of communication using, for example, one or more electronic devices. Such modes of communication can be associated with a specific format (e.g., a data unit format) that, in some instances, can be unique to that mode of communication (e.g., a different protocol, a different data unit structure or arrangement, etc.). For example, a cellular telephone (e.g., a smart phone) can send a communication to another cellular telephone using a short message service (SMS) modality. Thus, when referring to a modality or channel it should be understood that the modality or channel includes, defines, and/or otherwise is associated with a data unit format suitable for transmission of data via that communication mode.

As used in this specification, a "data unit" refers to any suitable portion of data. For example, data unit can refer to a data packet, a data cell, or a data frame such as, information that is delivered as a unit among peer entities of a network and that may contain control information, such as address information, user data, and/or the like.

FIG. 1 is a schematic illustration of a communication system 100 that can be used to, for example, aggregate, correlate, analyze, and/or display communications included in a conversation, according to an embodiment. The communication system 100 (also referred to herein as "system") includes a server 120 in communication with electronic devices 110 and 115 (also referred to herein as "client device(s)") via a network 105. As described in further detail herein, the server 120 can be configured to send one or more signals to and/or receive one or more signals from the electronic devices 110 and 115 via the network 105. In some instances, the signals sent and/or received over the network 105 can be associated with one or more communications included in a conversation between a user of the electronic device 110 and a user of the electronic device 115. Moreover, in some instances, the server 120 can be operable in the aggregation, correlation, analysis, and/or display of the communications between the user of the electronic device 110 and the user of the electronic device 115 regardless of a difference in communication modes (e.g., modalities) associated with each user.

The network 105 can be, for example, a local area network (LAN), a wide area network (WAN), a metropolitan area network (MAN), a worldwide interoperability for microwave access network (WiMAX), a telephone network (such as a Public Switched Telephone Network (PSTN) and/or a Public Land Mobile Network (PLMN)), an intranet, the Internet, an optical fiber (or fiber optic)-based network, a virtual network, a cellular network, and/or any other suitable network or combination thereof. Moreover, any portion of the network 105 can be implemented as a wired and/or wireless network. In some embodiments, the network 105 can include one or more networks of any type such as, for example, a LAN and the Internet.

The electronic devices 110 and 115 can be any suitable client device. For example, in some embodiments, the electronic devices 110 and 115 can be, for example, a personal computer (PC), a personal digital assistant (PDA), a smart phone, a laptop, a tablet PC, a video game console, a server device, and/or the like. In some embodiments, the electronic device 110 can be substantially similar to or the same as the electronic device 115 (e.g., both electronic devices 110 and 115 are smart phones). In other embodiments, the electronic device 110 can be different from the electronic device 115 (e.g., the electronic device 110 is a smart phone and the electronic device 115 is a PC.

Although not shown in FIG. 1, the electronic devices 110 and 115 each include at least a memory, a processor, a network interface, and an output device. For example, in some embodiments, the output device can be any suitable display that can provide at least a portion of a user interface for a software application (e.g., a mobile application, a PC application, an internet web browser, etc.) the electronic device 110 and/or 115. In such embodiments, the display can be, for example, a cathode ray tube (CRT) monitor, a liquid crystal display (LCD) monitor, a light emitting diode (LED) monitor, and/or the like. In other embodiments, the output device can be an audio device, a haptic device, and/or any other suitable output device. The network interface can be, for example, a network interface card and/or the like that can include at least an Ethernet port and/or a wireless radio (e.g., a WiFi® radio, a Bluetooth® radio, etc.). The memory can be, for example, a random access memory (RAM), a memory buffer, a hard drive, a read-only memory (ROM), an erasable programmable read-only memory (EPROM), and/or the like. The processor can be any suitable processing device configured to run or execute a set of instructions or code. For example, the processor can be a general purpose processor (GPU), a central processing unit (CPU), an accelerated processing unit (APU), and Application Specific Integrated Circuit (ASIC), and/or the like. The processor can be configured to run or execute a set of instructions or code stored in the memory associated with using, for example, a PC application, a mobile application, an internet web browser, a cellular and/or wireless communication (via the network 105), and/or the like, as described in further detail herein.

Figure 2:
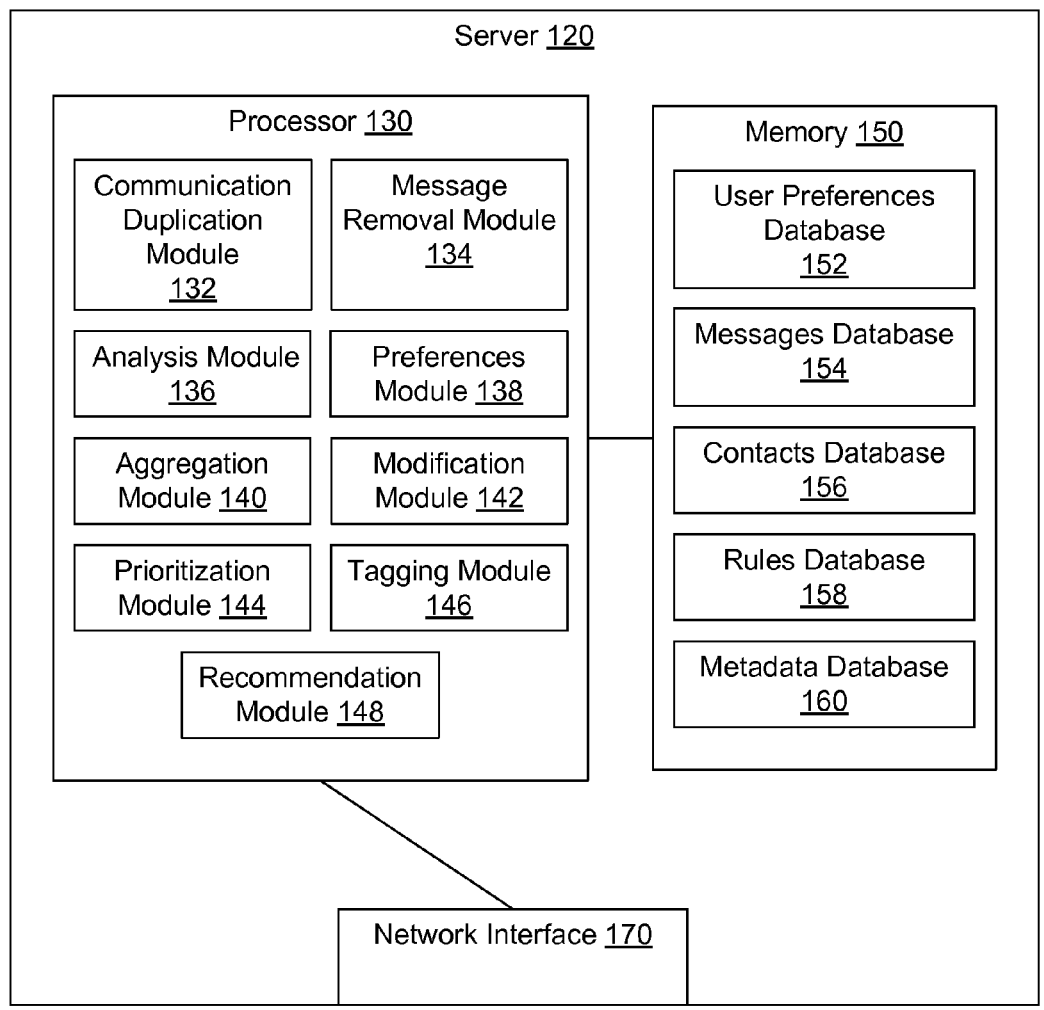
FIG. 2 is a schematic illustration of a server included in the communication system of FIG. 1.

The server 120 of the system 100 includes a processor 130, a memory 150 and a network interface 170, as shown in FIG. 2. The server 120 can be in a central location and accessible by the client devices 110 and 115, distributed in multiple locations and accessible by the client devices 110 and 115, and/or a combination thereof. Additionally, some or all components of server 120 may be located within the client device 110 and/or 115, or any other device(s) and/or server(s) (not shown). The server 120 can execute and/or perform any suitable function or process associated with facilitating a conversation between the user of the electronic device 110 and the user of the electronic device 115 regardless of a difference in modalities associated with the users, as described in further detail herein.

The network interface 170 of the server 120 can be, for example, hardware and/or software (e.g., stored in the memory 150 and executing in the processor 130) configured to allow the server 120 to connect with the electronic devices 110 and 115 and/or any other electronic device (not shown in FIG. 1), networks, and/or the like. In some embodiments, the network interface 170 can include one or more wired and/or wireless interfaces, such as, for example, Ethernet interfaces, optical carrier (OC) interfaces, and/or asynchronous transfer mode (ATM) interfaces. In some embodiments, the network interface can be, for example, a network interface card and/or the like that can include at least an Ethernet port and/or a wireless radio (e.g., a WiFi® radio, a Bluetooth® radio, etc.). The network interface 170 can include any other suitable component or a combination of components to receive and/or send signals using any suitable communication mode, as described in further detail herein.

The memory 150 can be, for example, a random access memory (RAM), a memory buffer, a hard drive, a database, an erasable programmable read-only memory (EPROM), an electrically erasable read-only memory (EEPROM), a read-only memory (ROM) and/or the like. In some embodiments, the memory 150 can store instructions to cause the processor to execute modules, processes and/or functions associated with system 100, as described in further detail herein. The memory 150 can include multiple databases, including a user preferences database 152, a messages database 154, a contacts database 156, a rules database 158, and a metadata database 160. Each database can be, for example, a table, a repository, a relational database, an object-oriented database, an object-relational database, a structured query language (SQL) database, an extensible markup language (XML) database, and/or the like. Although shown in FIG. 2 as being distinct databases, in some embodiments, the memory 150 can include and/or can store a single database having, for example, multiple parts, sectors, partitions, etc. In some embodiments, the memory 150 can store any additional database and/or any additional information used in the communication system 100 and/or any service thereof. In other embodiments, the memory 150 can include only a subset of the databases shown in FIG. 2.

The user preferences database 152 can store any suitable user preference associated with a user of an electronic device (e.g., the electronic device 110 and/or 115). For example, in some instances, the user preferences database 152 can store data associated with a user that can include a preferred mode of communication to receive and send messages (e.g., SMS format), while data stored in the user preferences database 152 associated with another user can include a different preferred mode of communication to receive and send messages (e.g., via email). In some instances, for example, a user can prefer to send messages via an SMS communication mode but receive messages via email or any other combination of communication modes. In some instances, the user preferences database 152 can store a user preference that can be based on a time such as, for example, a preferred time period to receive messages (e.g., 8:00 am to 5:00 pm) and/or a time period during which the user does not want to receive any messages (e.g., 10:00 pm to 6:00 am). In some instances, a user preference stored in the user preferences database 152 can be based on a location such as, for example, a preferred mode of communication while at work and a different preferred mode of communication while at home. In some instances, the location can be based on, for example, global positioning system (GPS) data associated with a user's smart phone, location data from a social networking site, and/or the like.

The messages database 154 can store, at least temporarily, messages that are intercepted and/or received by the server 120. In some embodiments, the messages database 154 can store messages for a predetermined time period (e.g., an hour, a day, a week, a month, a year, multiple years, and/or any fraction thereof). In other embodiments, the messages database 154 can store messages until, for example, a predetermined storage capacity is reached. In such embodiments, the messages database 154 can be configured to delete and/or write over previously stored data starting with, for example, the oldest messages. In some embodiments, each user can be allotted a predetermined amount of storage on the messages database 154.

The contacts database 156 can store, for example, a list of contacts and corresponding contact information associated with a user. For example, contact information can include a contact's name; photo; occupation; telephone numbers (e.g., home, work, cell, fax, etc.); email addresses (e.g., personal email address, work email address, and/or the like); social networking usernames, addresses, etc.; physical addresses (e.g., home address, mailing address, work address, etc.); birthdays; and/or any other suitable contact information.

The rules database 158 can store a set of rules and/or parameters associated with each communication modality. Such rules can include, for example, format, character limits, size limits, and/or the like. Thus, if a message is sent via a modality and a portion of the message violates the rules stored in the rules database 158 associated with that modality, the message can be returned to the sender for manual editing and/or can be automatically edited by the server 120, as described in further detail herein.

The metadata database 160 can store, for example, contextual information associated with conversations between users. For example, in some embodiments, the processor 130 of the server 120 can perform one or more processes or analysis on data stored, for example, in the messages database 154 to define an analyzed data set. The analyzed data set can include, for example, contextual information that was determined by analyzing the data stored in the messages database 154. As such, the analyzed data can be stored in the metadata database 160.

The processor 130 can be any suitable processor configured to run and/or execute a set of instructions (e.g., stored in the memory 150) associated with the system 100 and/or service thereof. In some embodiments, for example, the processor 130 can be a general purpose processor, a Field Programmable Gate Array (FPGA), an Application Specific Integrated Circuit (ASIC), a Digital Signal Processor (DSP), a central processing unit (CPU), and accelerated processing unit (APU), a network processor, a front end processor, and/or the like. The processor 130 can be configured to execute one or more hardware and/or software modules. For example, as shown in FIG. 2, the processor 130 includes a communication duplication module 132, a message removal module 134, an analysis module 136, a preferences module 138, an aggregation module 140, a modification module 142, a prioritization module 144, a tagging module 146, and a recommendation module 148. In some embodiments, the processor 130 can include and/or can be configured to execute any additional module used in the communication system 100. In other embodiments, the processor 130 can include only a subset of the modules shown in FIG. 2. Moreover, any of the modules can be combined into, for example, a single module that can be executed to perform any number of functions.

The communication duplication module 132 can, for example, receive a message via a communication mode and can define one or more other instances of the message with each instances being associated with a different communication mode (e.g., modality). As described in further detail herein, in some instances, the server 120 can receive a message via a communication mode, can define any number of instances of the message, and can then send the instances of the message via one or more communication modes associated with the intended recipient (e.g. a user).

The message removal module 134 can, for example, be operable in deleting at least a portion of a message. For example, in some embodiments, the server 120 can send multiple instances of a message (described above) to an electronic device (e.g., the electronic device 110 and/or 115). When a user opens an application to view an instance of the message, the message removal module 134 can send a signal that is operable to delete a portion of any other instance of the message, for example, according to a user preference (e.g., stored in the user preferences database 152). In some embodiments, the signal sent from the message removal module 134 can be operable in deleting the other instances of the message substantially in their entirety. In other embodiments, the signal sent from the message removal module 134 can be operable in deleting on a portion of each other instance of the message, as described in further detail herein.

The analysis module 136 can perform any number of processes and/or functions associated with analyzing data associated with a communication and/or a conversation. For example, in some embodiments, the analysis module 136 can perform a speech recognition analysis, a contextual analysis, a video analysis, and/or any other suitable analysis. In some embodiments, data defined by analyzing the communications and/or conversations can be stored, for example, in the metadata database 160.

The preferences module 138 can perform any number of processes and/or functions associated with defining one or more user preferences in a substantially automatic manner (e.g., without user intervention). For example, in some instances, the analysis module 136 can analyze data associated with conversations between a user and his or her contacts. In some instances, the analysis module 136 can determine, for example, a time period with the most communications, a response time to communications, a communication mode most frequently used, and/or any other data. In this manner, the preferences module 138 can receive the analyzed data from the analysis module 136 and define a set of user preferences (e.g., as described above) associated with a user and substantially without user intervention. In some instances, the user preferences can be determined and/or defined for each contact or a set of contacts of the user. In other instances, the user preferences can be, for example, global preferences that are collectively associated with the contacts of the user.

The aggregation module 140 can aggregate direct messages (e.g., one-one messages) and/or group messages (e.g., one-many messages, many-one messages, and/or many-many messages) with similar or different modalities into a single persistent record. In some instances, the aggregation module 140 can send a signal to a display of an electronic device to graphically represent the single persistent record regardless of a difference in modalities. In some instances, the aggregation module can organize and/or sort the aggregated data by, for example, contacts, relationships, time sequence, devices, dates, and/or the like. Thus, a user can view communications between themselves and another user on a single interface, as described in further detail herein.

The modification module 142 can modify and/or edit a message based at least partially on a user preference (e.g., stored in the user preferences database 152) and/or a modality rule (e.g., stored in the rules database 158). For example, in some instances, a user can define a user preference associated with receiving a message via a modality. Therefore, when a message is sent to the user (e.g., the user of the electronic device 110 or 115) via a different modality, the modification module 142 can modify and/or edit the message according to a user preference and/or a rule stored in the rules database 158.

The prioritization module 144 can define, for example an importance ranking associated with a sender of a message. For example, in some instances, messages from senders deemed as more important relationships (e.g., as defined by a user preference) can receive preferential treatment and/or a priority placement in the queue. In addition to prioritizing certain relationships over others, the prioritization module 144 can include the relationship messages from modalities to which the user is subscribed. In other words, by choosing a particular relationship from a list of relationships, the user can be presented with the messages, meetings and social commentary known to have originated from a specific individual or organization. In some instances, the prioritization module 144 can define an importance ranking in a substantially automatic manner (e.g., without user intervention) based at least partially on, for example, frequency of communication, relationship type, social networking similarities, location, occupation, and/or any other parameter. In some embodiments, the prioritization module 144 can be adaptive (i.e., continually and/or systemically updates prioritizations), as described in further detail herein.

The tagging module 146 can tag, flag, indicate, mark, separate, etc. any suitable data associated with a conversation. For example, the tagging module 146 can automatically tag data being saved with date, time, received from and/or a list of people included in the conversation, and/or any suitable keywords. Moreover, a user can manually add tags to the data. In this manner, the tags can designate subjects, topics, associations and/or the like that can be, for example, searchable and/or otherwise organized, as described in further detail herein.

By way of example, a user can create a tag called "family." The family tag can designate, as a group, family members within the user's contacts. Whenever a piece of data is tagged by the tagging module 146 with the family tag, the piece of data can be made available to the members of the family tag group. In some instances, a member of the tag group may access that piece of data if he or she is registered with and/or included in the system 120. If a member of the tag group is not registered, the member of the tag group can, for example, log in to a web based interface with a user name and password set by the user who tagged the data to access the data associated with that tag. For example, a user can define a tag called "brothers" that is made up of two family members, Jack and John. In some instances, the user can receive an email that includes information about a safe that the user has installed at the family vacation house. The email explains instructions on care along with other information on warranty information and the code "14345" to the safe. In some instances, the user may want to share the code with Jack and John and since the user has already defined Jack and John under the "brothers" tag, the user can highlight the code "14345" and, once highlighted, a prompt can be presented asking if user wants to save the highlighted data. If the user confirms, the server can automatically define a set of tags such as date, time, and keywords based the semantic analysis of the message. Additionally, the user can tag the email as "brothers." In some instances, an electronic device associated with the user can log the tags and send a copy to the server 120 to be stored under the user's account. With the tags stored by the server 120, the server 120 can search, for example, the contacts database 156, for Jack and John. If, for instance, Jack is a contact that also uses the system 100 (e.g., has an account), the server 120 can update his account with the tag data as well as push data to any or all electronic devices associated with Jack. Thus, Jack can access the communications associated with the "brothers" tag. John, however, may not have an account on the system 100, but can access data associated with the "brothers" tag by accessing a site and/or portal served from the server 120 with a username and password set by the user. From that site and/or portal, John can view the data associated with the "brothers" tag and/or any other tags of which he has been assigned by the user and/or by Jack.

The recommendation module 148 can make any suitable recommendation to a user based at least in part on analyzing data associated with the communications of that user. For example, the recommendation module 148 can recommend a gift, present, and/or a service to give to a person (e.g., a contact of the user) based on the conversations therebetween and/or online or social networking activity. Moreover, the recommendation module 148 can send a reminder or the like to the user of important dates (e.g., birthdays, anniversaries, etc.). In some instances, a user can also be presented a list of recommended gifts or similar relevant messages based on an analysis of their social networking traffic, websites visited, gift lists they have saved and are available from e-Commerce or like sites, and/or message analysis between that user and the contact and/or their social network by the analysis module 136.

In other instances, the recommendation module 148 can recommend a topic of discussion; a meeting place, date, and/or time; a restaurant and/or activity based on location and/or GPS data; and/or any other suitable recommendation, as described in further detail herein. In some instance, the recommendation module 148 can recommend a best time to send a message to a contact based at least in part on previous communications, social media activity and/or status, instant message status, schedule, and/or the like. Moreover, the recommendation module 148 can be configured to continually and/or systematically update recommendations based on new communications. In some instances, the data associated with newer communications can influence recommendations more than older communications. In some instances, based on the recommendation of the best time to send a message to the contact, the server 120 and/or the recommendation module 148 can send a signal to the user representing a question to send the message now, regardless of the recommended time, or schedule the sending of the message.

As shown in FIG. 1, the server 120 is in communication with the electronic device 110 and the electronic device 115 via the network 105. The arrangement of the system 100 can be such that the server 120 maintains connection to the electronic devices 110 and 115 and receives and/or intercepts a communication (e.g., a signal representing, for example, video data, audio data, text data, and/or a combination thereof) from the user of the electronic device 110 prior to the communication being received at the electronic device 115 (or vice versa). The communication can be sent via any communication mode or modality such as, for example, email, instant message, Short Message Service (SMS) message, Multimedia Messaging Service (MMS) message, specific site messenger interfaces, a social application web post, a voice utterance, a voicemail, a video feed, etc. In some instances, information associated with the user of the electronic device 115 can be stored, for example, as a contact in a contact list stored on the electronic device 110 by its user (or vice versa). In this manner, the user of the electronic device 110 can select the contact information associated with the user of the electronic device 115.

Figure 3:
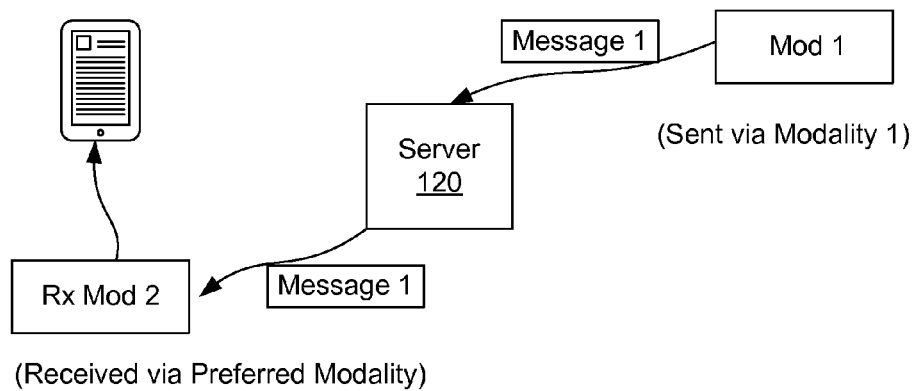
FIGS. 3 and 4 are schematic illustrations of a process of the server of FIG. 1 sending a message via one or more communication modes based on a user preference.
Figure 4:
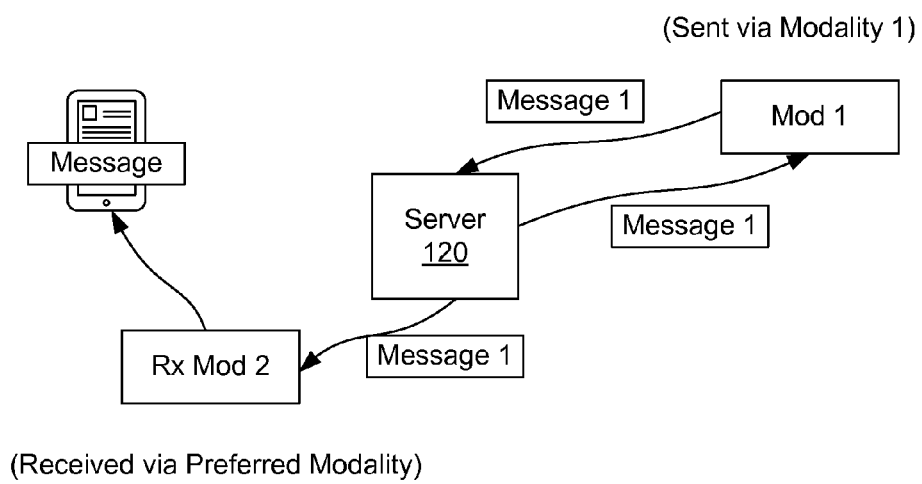

As shown in FIGS. 3 and 4, the server 120 can receive and/or intercept a communication (e.g., signal representing data associated with a communication that is sent via a wired or wireless connection) from the electronic device 110 to the electronic device 115. In some embodiments, the interception can be performed at or by an application or module of the electronic device 110 (e.g., a software module stored in the memory of the electronic device and executed by the processor that is associated with the system 100). In other embodiments, the interception of the communication can be performed at or by a message server (e.g., an outgoing message server) associated with the electronic device 110. For example, instead of sending an email message from the electronic device 110 to an email message server (e.g., an inbound message server) associated with the electronic device 115, the email message can be, for example, sent first to a simple mail transfer protocol (SMTP) server included in and/or otherwise associated with the server 120. Alternatively, the communication can be sent to an inbound server associated with the electronic device 115 and the server 120 can register a proxy service to automatically retrieve the message from the inbound server prior to the user of the electronic device 115 being notified about a new inbox message (e.g., communication). In some embodiments, the proxy service can be installed at or on the inbound server associated with the electronic device 115 (e.g., as an application or software module associated with the system 100) and configured to forward incoming messages to the server 120. In other embodiments, a proxy service can be installed to notify the server 120 when an incoming message arrives and, once notified, the server 120 retrieves the message on demand. In still other embodiments, a proxy service can be installed at or on the electronic device 115, for example, as an application or module associated with the system 100 and configured to intercept the message when being downloaded into an application on the electronic device 115.

Although particular methods of intercepting a communication are described above, the server 120 can employ any other push or pull based means for intercepting and/or for obtaining callbacks when a new message leaves an application installed on the electronic device 110 or when a new message arrives at an application installed on the electronic device 115 (or vice versa). Although communications are described as being sent from the electronic device 110 to the electronic device 115, in other instances, communications can be sent from the electronic device 115 to the electronic device 110 in a similar manner. Thus, a discussion of the communications between the electronic devices 110 and 115 in a particular manner (e.g., sent from or received by) can apply to communications in an opposite direction unless the context clearly states otherwise.

After intercepting and/or receiving a message or communication, the server 120 can at least temporarily store the message (e.g., in the messages database 154 of the memory 150). In some instances, the server 120 can perform one or more processes and/or analysis on the message (e.g., data packet analysis, deep data packet analysis, and/or the like) to determine, for example, an intended recipient, a modality of the message, a time the message was sent, and/or any other information. For example, in some instances, the server 120 can intercept and/or receive a message sent from the user of the electronic device 110 to the user of the electronic device 115. The server 120 can analyze data associated with the message to determine, for example, that the message is intended for the user of the electronic device 115. In some instances, the server 120 can verify and/or compare data associated with the intended recipient with data stored, for example, in the contacts database 156. If the intended recipient is verified (e.g., the server 120 queried the contacts database 156 and found corresponding data associated with a contact), the server 120, for example, can query the user preferences database 152 to determine one or more user preferences associated with that contact.

As described above, the user preference can be, for example, a preferred modality and/or modalities, a preferred time to receive messages, file size limit, file type limit, attachment restrictions, location based preferences, and/or the like that are defined by the contact. For example, a user can prefer to receive a message via email during work hours (e.g., 8:00 am to 5:00 pm). In some instances, a user can prefer to receive a message via an audio modality (e.g., voicemail, live telephone call, etc.) while driving in the car (e.g., determined by location data and/or an association with the vehicle). In such instances, the server 120 can convert, for example, a textual message into an audio message (e.g., to be played via a hands-free device or the like). The user preferences can be associated with a single message or a group of messages. For example, a user preference of a character limit can be associated with a single communication, while a user preference associated with a file size can be associated with a conversation (e.g., multiple communications) between a sender and a receiver. In some instances, a user preference can be changed (e.g., directly by the user and/or at least partially automatic by the preferences module 138) based on a schedule and/or calendar events. For example, a user can prefer not to receive communications during a meeting and/or while on vacation. In such instances, the server 120 can receive data associated with the user's schedule and/or calendar and can change for example, a user's status and/or temporary preference.

Moreover, a user preference can be based on, for example, a semantic analysis of a message. For example, a user can define a first set of preferences associated with communications from a coworker that are related to work and a second set of preferences associated with communication from the coworker that are related to their personal relationship (outside of work). In such embodiments, the analysis module 136 can perform, for example, semantic analysis, speech recognition analysis, and analysis of the time and/or date of the communication, analysis of the sender's location and/or his or her own location, and/or the like to determine the context of the communication. Although described as being defined by a user, in other instances, the user preferences can be determined by, for example, the preferences module 138 based on analyzing the communication and/or conversations associated with the contact or user.

Once the contact has been verified and a user preference associated with the contact has been determined, the server 120 can send the message (e.g., a signal representing the message) to the contact (e.g., the user of the electronic device 115), according the user preferences associated with that contact. For example, in some instances, the message sent from the user of the electronic device 110 can be sent via an SMS modality. The server 120 can analyze the message to determine, for example, the modality of the message, the intended recipient (e.g., intended contact), user preferences associated with that recipient, and/or the like. In some instances, the server 120 can determine that the contact prefers to receive messages, for example, via email. In such instances, the modification module 142 of the server 120 can modify, edit, transform, convert, and/or otherwise change a format (e.g., a data packet format or frame) of the message to the preferred modality of the contact. In some instances, the modification module 142 can, for example, change and/or convert the message to the preferred modality according to one or more rules, associated with that modality, stored in the rules database 158. With the message changed and/or converted to the preferred modality, the server 120 can send a signal representing the message in the preferred modality to the contact (e.g., the user of the electronic device 115), as shown in FIG. 3. In some instances, data associated with the user preference can include, for example, a preferred time period to receive messages from the sender of the message and/or a sender of any message. If, for example, the server 120 receives the message at a time outside of the preferred time period (e.g., 8:00 am to 5:00 pm), the server 120 can at least temporarily store the message in the messages database 154 until a time within the preferred time period.

In some instances, the server 120 can define, for example, an expected response time period for a contact based at least in part on data associated with previous responses, communication mode, time that the message was sent, and/or the like. If, for example, the server 120 does not receive a response to the message within the expected response time period, the server 120 can send a signal to the sender of the message to alert the sender that the contact has not yet responded. In some instances, the user can choose to send a follow up message or the original message via the same modality, or have the server 120 send the message via another modality of preference. If a user chooses a modality that requires the message to be altered because of file size, character limitations or other constraints, the system can ask if the user wants the first "x" amount of characters to appear, or if the sender wants to manually edit the message. In some instances, the user can choose to send a follow up message and/or the original message via multiple modalities. In some instances, the server 120 can also send the contact a notification message or the like to notify the contact that there is an unread message. For example, if a user sends a contact an email and the contact does not respond in the predicted amount of time based on a past history of response times, the server 120 can send a text message to the contact to alert him or her that there is an email waiting for them from the user.

In some instances, the intended recipient is not verified with contact information stored in the contacts database 156 (e.g., the intended recipient is not associated with and/or otherwise does not use the system 100). In such instances, the server 120 can forward the message and/or send a signal representing the message to the intended recipient via the modality used to send the message. Similarly stated, if the intended recipient is not associated with a user preference, the server 120 can forward the message and/or send a message representing the message to the intended recipient via the modality used to send the message. In other instances, a sender of a message may not be associated with the system 100 but the intended recipient is associated with the system 100. In such instances, the message from the sender can be intercepted by and/or received at the server 120 (e.g., as described above), and the server 120 (e.g., the modification module 142) can modify the message to define an instance of the message in the preferred modality of the intended recipient.

Although the modification module 142 is described above as changing and/or converting the message to the contact's preferred modality, in some instances, a signal can be sent to the sender of the message to change one or more parameters of the message to comply with the rules associated with the contact's preferred modality, as shown in FIG. 4. For example, a preferred modality may have a character limit that was exceeded by the original message. In such instances, the server 120 can send a signal to the sender with, for example, a recommendation (e.g., defined by the recommendation module 148) for changing the message so that it complies with the rules of the preferred modality. For example, in some instances, the sender can reduce the characters in the message to comply with the rules of the contact's preferred modality and the changed message can be sent to the server 120. The server 120 can then change the format of the message and send the message to the contact, as described above. In some instances, the modification module 142 can automatically make any changes to comply with the rules of the preferred modality. In some instances, changes can include, for example, eliminating attachments, decreasing file size of the message and/or of an attachment, and/or adding or subtracting any other suitable message element.

Although described above as sending a message to a single receiver or contact, in some instances, a user or sender can send a message to multiple contacts. In such instances, the message can be delivered to each receiver at substantially the same time or at different times. For example, the message can be sent to each individual receiver at the time and/or via the modality suggested by the recommendation module 148 of the server 120. The server 120 (e.g., the recommendation module 148) can suggest the best time to contact receivers and present the sender with an expected response time of each receiver based at least in part on past communication activity between the sender and the receiver, social media activity streams and posts of the receiver(s), and/or analysis of activity of receiver(s) on the server 120 if they are also registered. In some instances, the analysis can be performed by, for example, the analysis module 136 of the server 120 (FIG. 2). In some instances, a sender can send a message to a list of receivers using, for example, an email list provider where the message is batched by a specified time. In some instances, the server 120 can add an intelligence layer that segments the list by receiver and can send the message to the receiver at the best time and/or via the best modality for that receiver. This allows the sender to have a better chance of the message being opened and read. In some instances, the sender can override the suggestion of best time and modality and/or select any combination of best time, best modality or send all at once regardless of system analysis suggestions. The sender can also select to send a subset of the list at the system suggested time and/or modality and another subset substantially simultaneously.

Figure 5:
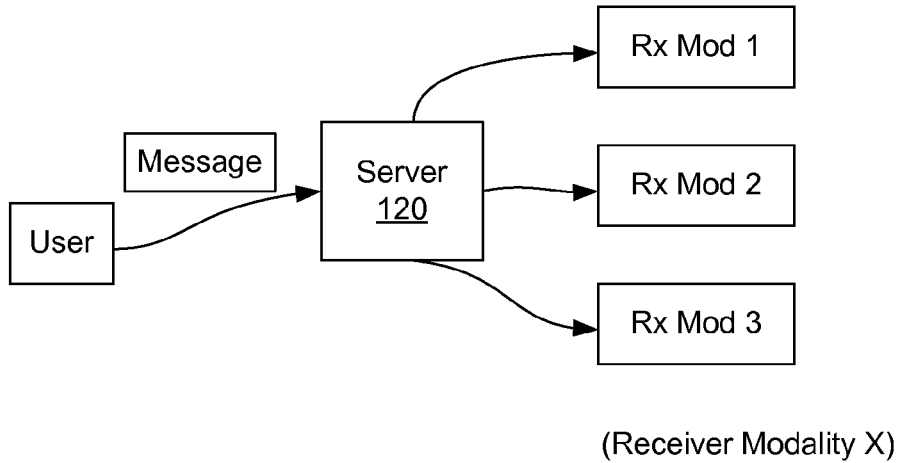
FIGS. 5 and 6 are schematic illustrations of a process of the server of FIG. 1 sending a message via multiple communication modes based on user preference.
Figure 6:
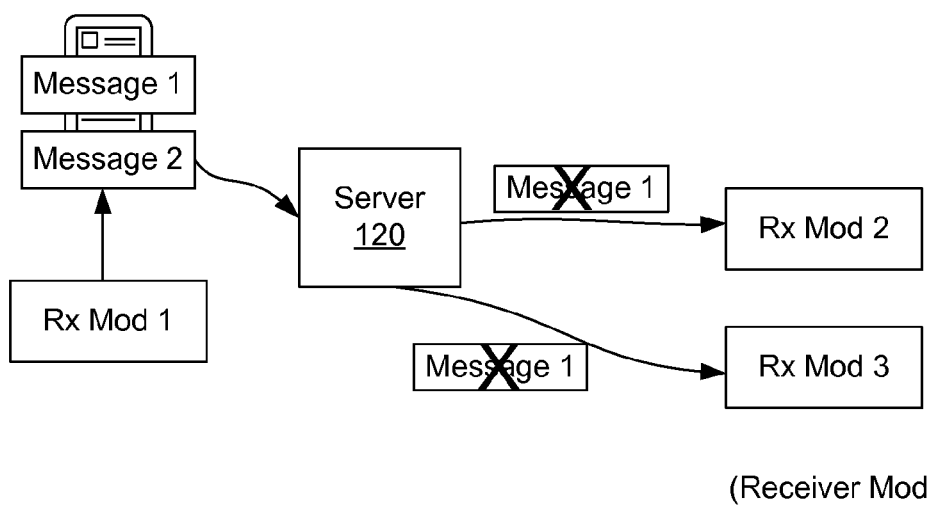

Referring to FIGS. 5 and 6, in some instances, a communication originating with a user of a first electronic device (not shown) can be sent to a user of second electronic device (not shown) via a modality (e.g., email, instant message, SMS message, MMS message, specific site messenger interfaces, voicemail, etc.). As described above, the server 120 can be configured to intercept and/or receive the message prior to the message being delivered to the second electronic device. In some instances, the server 120 can analyze data associated with the message to determine, for example, contact information, user preferences, and/or the like associated with the intended recipient of the message. In some instances, the server 120 (e.g., the modification module 142) can convert, translate, modify, format, and/or otherwise change the message from the original modality to a modality associated with the contact. Moreover, in some instances, the contact can be associated with multiple modalities. As such, the communication duplication module 132 can duplicate at least a portion of the data associated with the message to define a set of instances of the message, each of which are associated with a different modality associated with the contact.

For example, a message can be sent via an instant message modality from the user of the first electronic device to the user of the second electronic device. The server 120 can intercept and/or receive the message and can define a set of instances of the message with each instance being associated with a different modality, according to a user preference of the user of second electronic device. For example, the server 120 (e.g., the communication duplication module 132 and/or the modification module 142) can define an instance of the message associated with an SMS modality, an email modality, and a social network modality. With the instances defined, the server 120 can send the instances of the message to the user of the second electronic device, as shown in FIG. 5. In some instances, the message in the original modality and/or a signal representing the message in the original modality can also be sent to the user of the second electronic device. In other instances, the message in the original modality need not be sent to the user of the second electronic device. Thus, the instances of the message can be sent to corresponding inboxes of applications associated with each modality. For example, the instance of the SMS modality can be sent to the inbox of an SMS message application stored, for example, in the memory of the second electronic device.

Although described above as sending multiple instances of the message to, for example, the second electronic device, in some instances, the user of the second electronic device can also be associated with other electronic devices. In such instances, the user can define a user preference associated with which specific electronic device can send and/or receive messages, the modalities associated with each electronic device, and/or the like. In this manner, the user can, for example, define a user preference associated with receiving the instances of the message at multiple electronic devices. Accordingly, the server 120 can send the instances of the message to the multiple electronic devices associated with the user based on the user preference.

In some instances, after the user of the second electronic device retrieves and/or accesses an instance of the message (e.g., accesses the instance of the message associated with the email modality), at least a portion of data associated with the unused, unretrieved, and/or non-accessed messages from the remaining communication modes can be deleted. For example, after the user of the second electronic device opens the email message (e.g., using an email application and/or an internet web browser), a return message can be defined by the second electronic device (e.g., substantially automatically using a software and/or hardware module) and sent to the server 120. The return message can be stored, at least temporarily, in the messages database 154. The return message can include data to indicate to the server 120 that the user of the second electronic device has opened the email message. Additionally, in some embodiments, this return message can include other pertinent information such as the time and date the message was viewed and also in which communication modality/channel, the specific application, and/or device was used to open the message.

The server 120 can send data associated with the return message to, for example, the message removal module 134. In this manner, the message removal module 134 can determine, based on the received data, the modality used to access the message and the other modalities associated with the other instances of the message that were not accessed. In some instances, the server 120 and/or the message removal module 134 of the server 120 can send a signal to the second electronic device that can include instructions to delete at least a portion of the other instances of the message from the associated inboxes, as shown in FIG. 6. In some instances, the portion of the data can be, for example, a new message notification and/or the like. In other instances, the instructions can cause the second electronic device to delete substantially the entire message from the inboxes. Moreover, when the instances of the message are sent to multiple electronic devices (as described above) associated with the receiving user (e.g., the user of the second electronic device), portions of the data associated with each instance of the message can be deleted from the corresponding inbox on each electronic device. In this manner, the user of the first electronic device can reach the user of the second electronic device quickly and efficiently by ensuring that whichever communication modality and/or whichever electronic device the receiving user is using at a given time will receive the message. Furthermore, by deleting at least a portion of the other instances of the message, the user of the second electronic device is not bothered by duplicate messages.

Figure 7:
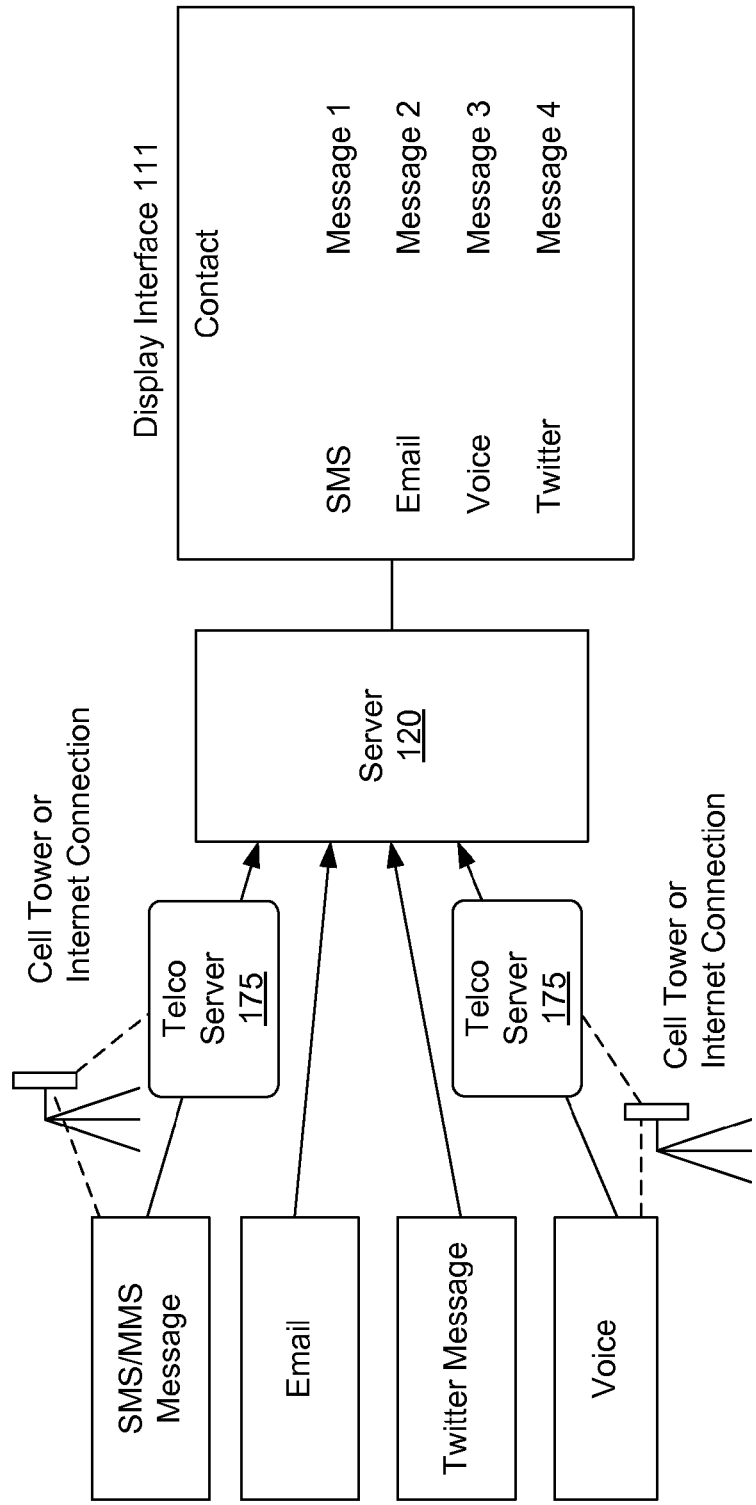
FIG. 7 is a schematic illustration of the server of FIG. 1 aggregating and displaying messages between two or more parties on a single interface regardless of the communication mode of the original message, according to an embodiment.

Referring to FIG. 7, messages between two or more users can be aggregated and displayed on a single interface regardless of the source and/or modality of the original message (e.g., an SMS message, an email message, a voice message, and/or a twitter message). For example, in some embodiments, the aggregation module 140 of the server 120 (FIG. 2) can aggregate direct messages and/or a group of messages with different modalities from one person to another person into a single display interface 111. In some instances, the messages can be organized by contact and/or relationship and displayed on the display interface 111 (also referred to herein as "interface") in a time sequence across a data receiving device. In some embodiments, the interface 111 is persistent and accessible across multiple data receiving devices. That is too say, in some instances, the aggregated messages can be displayed in a persistent record on any electronic device (e.g., a data receiving device) associated with a user. In some instances, the aggregated messages can be displayed in a persistent record via, for example, an internet web browser. In such instances, the user can view the persistent record of messages on an electronic device that is not associated with the user (e.g., the user has not registered the electronic device with the server 120 but rather access the aggregated messages stored by the server 120 (e.g., stored in the messages database 154).

For example, in some instances, a message can be sent from a user of a first electronic device to a user of a second electronic device via a communication modality/channel. In this example, for simplicity, the user of the first electronic device is a first user and the user of the second electronic device is a second electronic device. Thus, when a referring to a message sent from the first user to the second user (or vice versa) in this example, it is intended to mean a message is generated by the first user on the first electronic device and sent to the second electronic device to be presented to the second user. After the first user commits to send the message (e.g., presses a send button or the like included in an application on the first electronic device), the message can be intercepted and/or received by the server 120, as described in detail above.

In some instances, the message can pass though one or several other nodes prior to being intercepted and/or received by the server 120. For example, the first user can send an SMS message that can be received at an Ethernet server (e.g., a Telco server 175) and from there dispatched and/or forwarded to, for example, the second user. As shown in FIG. 7, however, the message can be intercepted and/or routed to the server 120 prior to being sent to an SMS inbox of the second user. Alternatively, the first user can modify their mobile phone to use, for example, a phone number associated with the server 120 as an SMS gateway instead of, for example, the Ethernet provider (e.g., the Telco server). Alternatively, any other means for intercepting the SMS message can be utilized by the server 120.

As described above, once the message is received by the server 120, the server 120 can analyze data associated with the message to determine relevant data such as, for example, the sender's contact information, the intended recipient's contact information, a time set, a modality, etc. In this manner, the server 120 can compare and/or verify an intended recipient's identity with, for example, a contact stored in the contacts database 156 (FIG. 2). In this manner, appropriate contact information associated with the sender (e.g., the first user) and/or the receiver (e.g., the second user) can be identified. With the contact information identified, the server 120 can determine and/or select the preferred delivery communication modality or modalities associated with the contact. In some instances, the server 120 can convert and/or otherwise change the message to define an instance of the message in the preferred modality, as described above. In some instances, the server 120 can convert and duplicate the message to define any number of instances of the message, each of which is associated with a different modality, as described above. Once defined, the server 120 can send one or more instances of the message to the second user according to, for example, his or her user preference.

In some instances, as a number of communications or messages in a conversation increase, the server 120 can define a time based log (e.g., within the messages database 154 of FIG. 2 or as a separate storage). In some instances, the server 120 can send a signal representing the time based log to the first user and/or to the second user. In other instances, an application (e.g., installed in or on the first electronic device and/or the second electronic device) can access the time based log stored by the server 120 (e.g., in the messages database 154). In this manner, an application (e.g., a software module or the like executed in hardware) installed on the first electronic device and/or on the second electronic device can display the time based log of the messages included in the conversation, regardless of differences in modalities. In some instances, the second user, through or from the interface 111, can reply to the message via the modality that it was delivered, and/or can select another modality to use for the reply.

Although described above as being displayed in a time-based log, in some instances, conversations including messages using multiple modalities can be presented in a relationship based format rather than time based log. For example, in some instances, the prioritization module 144 of the server 120 (FIG. 2) can be configured to separate message senders and/or organize messages in such a way that more important relationships receive, for example, a higher priority level, special treatment, and/or a priority placement in a queue and/or log. In addition to prioritizing certain relationships over others, the prioritization module 144 and/or other aspect of the server 120 can store a log of relationship messages from modalities to which the user is subscribed. In other words, by choosing a particular relationship from a list of relationships, the user can be presented with the messages, meetings, and/or social commentary known to have originated from a user associated with that relationship. In this way, relationship messages can remain coherent and easily accessible to allow, for example, a more efficient message management by a user.

In some instances, a user can initially place relationships into one or more relationship type groups such as friends, family, coworkers, etc (e.g., stored in the contacts database 156). The prioritization module 144 can prioritize the messages and/or conversations based on, for example, frequency of communications, relative time to a meeting, user defined preferences, and/or any other variables to prioritize the relationship and/or communications. In some instances, a contact that is registered and/or that is associated with (e.g., uses) the system 100 can receive a higher prioritization level than a contact that is not registered to use the system 100. In some instances, calendar event(s) can be organized into a relationship with one or more people and/or contacts. For example, if Joe Smith is a contact of the user, data associated with the user's relationship with Joe Smith can include events and/or the like in which the user has engaged with Joe. In some instances, the prioritization module 144 can place and/or organize a calendar event in line with another communication "event" (e.g., a message such as email, SMS, voicemail, etc.) included in that relationship. Thus, calendar events can be prioritized and/or organized in a similar manner as other communications with the user.

Figure 8:
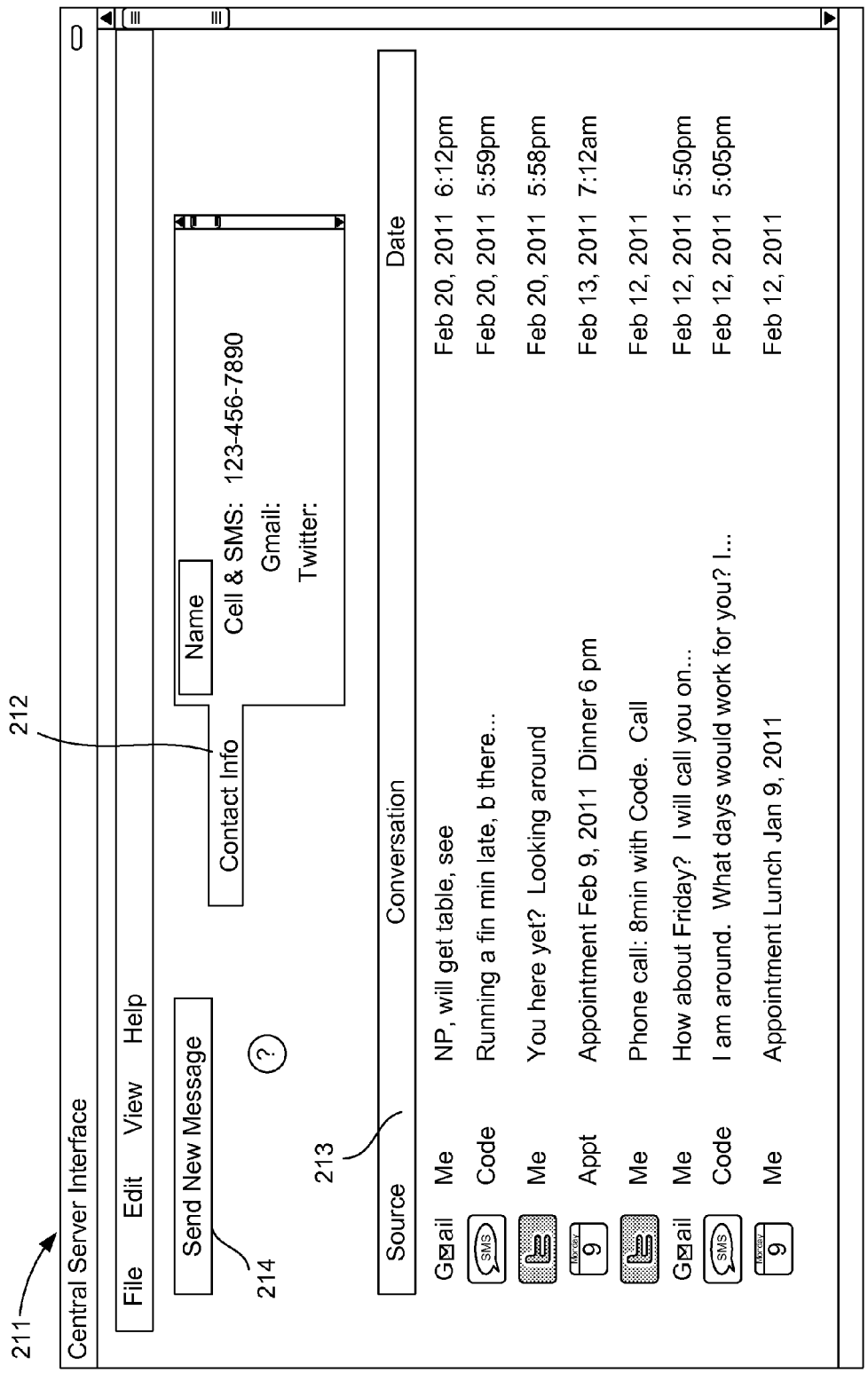
FIG. 8 is a schematic display of an interface showing conversations using various communication modes organized based on a relationship between users, according to an embodiment.
Figure 11:
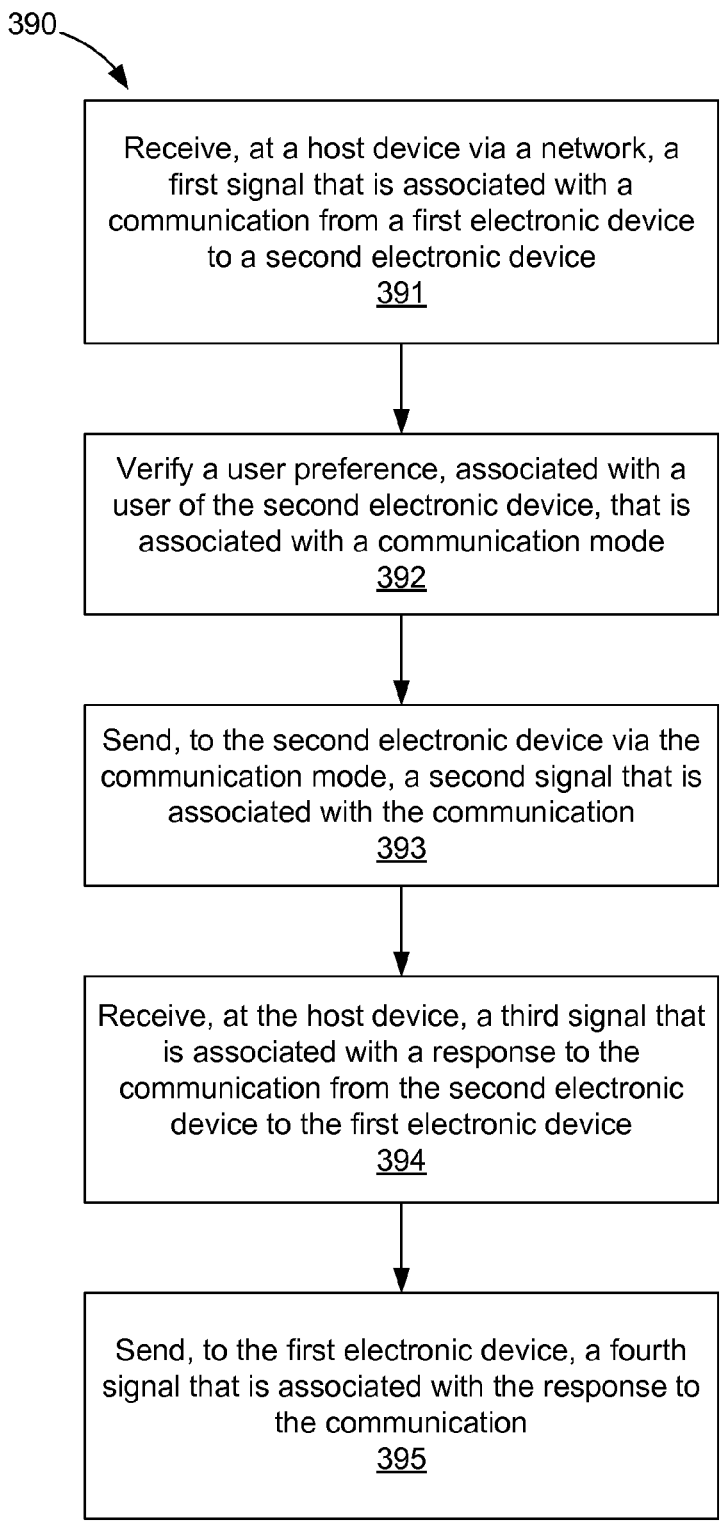
FIG. 11 is a flowchart illustrating a method of aggregating, correlating, analyzing, and displaying communications included in a conversation, according to an embodiment.

The organization and display of this relationship data can present a rich environment and history log with a given person (e.g., contact) or an organization (e.g., a company) that can allow for relatively easy access to contact information (or other personal information) about that person or organization. For example, FIG. 8 illustrates an interface 211 according to an embodiment. The interface 211 can be, for example, presented on a display of an electronic device included in and/or associated with a system such as, for example, the system 100. As described herein, the interface 211 can provide an interface with which a user can interact with the system. For example, in some instances, a user can select a contact information portion 212 to display contact information associated with a contact (e.g., stored in a database such as the contacts database 156 of FIG. 2). In some instances, a record portion 213 that can include communications, conversations, and/or calendar events between the user and that contact can become active. More particularly, the record portion 213 can display communications, conversations, and/or calendar event information associated with the contact together regardless of a difference in communication mode (e.g., modality) in, for example, a time-based log. For example, as shown in FIG. 11, the record portion 213 can display a conversation between the user and a contact that can include communications sent or received via email (e.g., as indicated by Gmail® in FIG. 11), communications sent or received via Twitter® (e.g., as indicated by the "t"), communications sent or received via SMS, and communications sent or received via a communication mode associated with a calendar event (e.g., an emailed calendar invite and/or the like).

While discussed with respect to FIG. 8 as displaying messages received via multiple communication modes in the record portion 213, in some embodiments, the server receives the messages via a communication mode (e.g., email, SMS, IM, etc.). The server then modifies, translates and/or reformats the message into a communication mode associated with the interface and sends the message to a client device displaying the interface 211. In such a manner, the interface can read and display the message based on the communication mode associated with the interface 211. In such embodiments, the server can provide an indication to the interface 211 regarding the original communication mode of the message. Accordingly, the interface 211 can display an indication of the source.

Similarly, in some embodiments, the messages sent from the interface 211 can be sent to the server in the format associated with the interface. For example, in some instances, the user can send a communication directly from the interface 211. For example, in some instances, the user can select a "Send New Message" link 214 to send a communication directly from the interface via the communication mode associated with the interface. The server can then modify, translate and/or reformat the message into the communication mode associated with a recipient's preference (e.g., other than the format associated with the interface), as described above. In other embodiments, the sender can provide to the server an indication of a preferred communication mode. In such embodiments, the data sent to the server with the message can include an identifier indicating the preferred communication mode. In such embodiments, the server can modify, translate and/or reformat the message into a format associated with the preferred communication mode and send the message to the recipient via that mode. In other embodiments, and similar to the description with respect to FIGS. 5 and 6, the server can modify, translate and/or reformat the message into multiple formats (e.g., for multiple instances) associated with multiple communication modes for the recipient. The server can then send multiple instances of the message (e.g., one per each communication mode) to the user. The recipient can then receive the message via one or more of the communication modes.

In some instances, the user can select a place or event at which the user may have a meeting. In some instances, relevant information associated with the place or event such as, for example, weather, traffic, delays, cancellations, etc., as well as, contacts planning to attend can be presented in the interface 211. Expanding further, in some instances, when planning an event, the system can aggregate data and/or define or present links to data associated with the event place, people involved, and/or other elements regarding specific aspects of the event. Thus, the interface 211 can be interactive. In some instances, links or the like associated with the person(s) that the user is meeting can be interactive such that when the user selects a contact (e.g., presses a button and/or a link, hovers over their name, etc.) the contact information portion 212 can be presented and other social media elements related to that person (e.g., displayed in the events record portion). Similarly, selecting the location and/or place of the event can provide weather forecasts, news, and other travel information. If the user's event involves travel and the user's flight information is entered, that piece of information can connect with an airline's database/server and become active in its ability for the user to get updates on delays, check-in, or flight transfers from the event file without having to navigate to another browser to obtain that information.

In some instances, the system (e.g., a server such as the server 120) can log places that the user visits and stays. If the user visits the same location again, the system can ask if the user would like to copy the past trip on the new dates. For example, based at least in part on location data received from an electronic device associated with the user, the server can determine that the user has previously visited his or her current location. As a result, the server can send a signal to the electronic device that is associated with a request to access data associated with the previous visit. If the user confirms, the system can substantially in an automatic manner access online reservation systems, flight information, weather information, traffic information, and/or the like. If automation is not available, the system can be configured to open one or more specific websites in different tabs or windows of the user's web browser to allow easy booking, thereby substantially eliminating the need for the user to input and navigate to the websites for the trip. If automation is available, but a hotel with the user's preferences (e.g., king bed, first floor, non-smoking) is unavailable, the system can make recommendations of nearby similar hotels or services (e.g., a module such as the recommendation module 148 can make a recommendation).

In some instances, a user can send a message to multiple people and that correspondence can be stored in a time based coherent dialog (as described above). For example, in some embodiments, the time based dialog can be a forum post or the like allowing those on the list to reply and others to read. Any reply using, for example, reply-all can be sent to those that are not associated with the system in such a way so that they can view the entire conversation. For example, in some embodiments, a module of the server such as, for example, the aggregation module 140 (FIG. 2) can aggregate communications in a multiple user conversation in a time-based dialog regardless of a difference in modality. In this manner, the multiple people (users and/or contacts) can be a group and the messages associated with that group are presented in a time based dialog display.

In some instances, activity of the user on an electronic device can be monitored and can be used to determine, for example, a status of the user or the like. For example, in some instances, messages can be sent to a contact that may or may not be associated with the current actions of the contact (e.g., user). In this manner, by monitoring user activity, the server can determine if a message is worth interrupting the user based on its relevancy and/or the like. For instance, if a user is working on an excel spreadsheet and a message is sent from a co-worker that mentions the name of the spreadsheet file or information within the excel worksheet, then the system can determine that the message is worth interrupting the user.

As described above, a server such as the server 120 (FIG. 2) can analyze messages, events, conversations, and/or the like to define, for example, associated metadata (that can be stored in a database such as the metadata database 160). The metadata can include, for example, contextual information, connotations, strength of a relationship, basis of a relationship, and/or the like. By way of example, if a user is working for a company and leaves that company, a working knowledge of the strength and/or formality of relationships, projects, deals, or other things relating to the company is mostly lost beyond what others may know or what documents the user has left behind. In some instances, however, the server can store and/or generate logs associated with metadata of the user's interactions, as described above. In this manner, the nuances of the relationships the user had with co-workers, clients, deals, companies, etc. is not lost when the user leaves the company. Moreover, the server and/or the like can be configured to organize the metadata in a form that is usable (e.g., presentable on a display of an electronic device) to pass on to someone who takes that user's place. Thus, the metadata can decrease, for example, a ramp up-time for the new user to understand the nuances of the interactions, relationships, projects, and/or deals the previous user in that position was working on or things that were important to the success of being in that position. In some instances, the metadata can also be aggregated and analyzed across a company or a group of users on the system and displayed in a graphic or text format to view trending topics and interactions. This metadata can also be used for any other use such as, for example, client/customer relations, real-time team activity, individual staff person productivity analysis, and human resource reporting support to suspicious activities monitoring or forensics. In some instances, the system can be configured to generate, aggregate, analyze, and present metadata in a similar manner as any of the systems described in co-pending U.S. patent application, entitled "Systems and Methods for Dynamic Analysis, Sorting and Active Display of Semantic-Driven Reports of Communication Repositories," filed on the same day as this application, the disclosure of which is incorporated herein by reference in its entirety.

As described above, a system such as the system 100 can make recommendations based at least in part on data from communications between users. In some embodiments, a module such as, for example, the recommendation module 148 can be included in a server such as, for example, the server 120. In some instances, a recommendation process can be performed on or in a network of known users. In such instances, an individual user may have, for example, an identity description within which they can place important dates and/or events to be remembered (e.g., information associated with a contact and stored, for example, in a contacts database 156 or the like). Additionally, a contact may recognize special occasions on their social network accounts. These events can be stored by the server, and in some instances, the data can be correlated and shared with other users within the user network. Such data can be analyzed using, for example, semantic search and analysis queries and/or the like. From the analysis of the data along with an analysis of generic user demographic data, the module can define, for example, an appropriate suggestion for gifts or commemorations. Moreover, events can be organized into a coherent stream of important events and data can be presented to other users and/or the originating user (e.g., as a notification and/or the like) at the appropriate time using a message sent to the users (e.g., via their preferred modalities).

Figure 9:
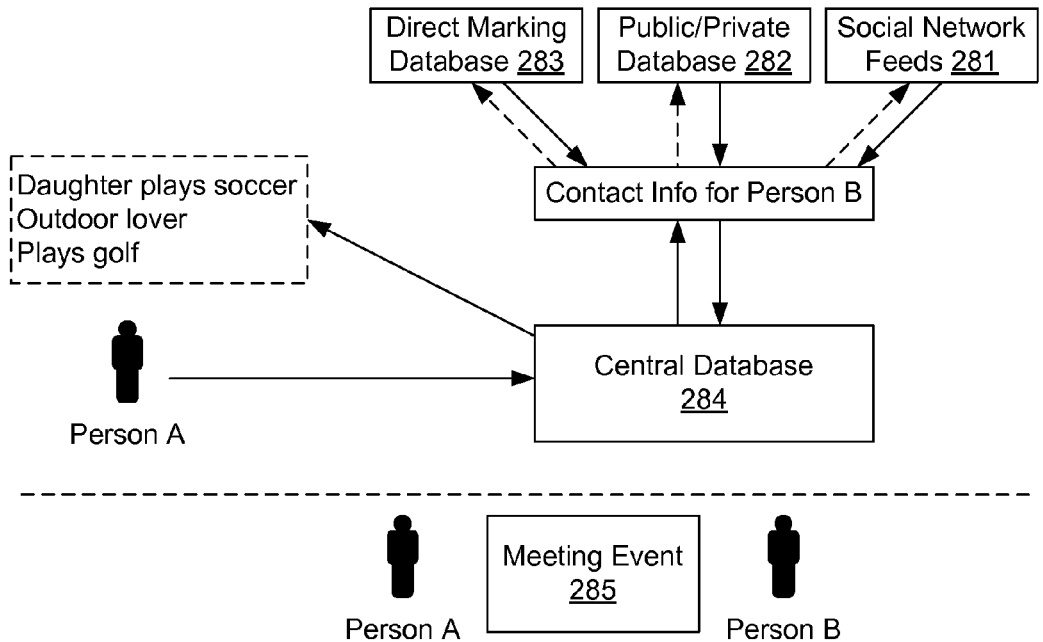
FIG. 9 is a schematic illustration of a central database for providing recommendations to users based on analysis of social networking streams and other public information, according to an embodiment.

As shown in FIG. 9, in some instances, the system can recommend to person A (e.g., a user) discussion points associated with a person B based on an analysis of social networking feeds 281 of person B, information associated with person B stored in public or private databases 282, information associated with person B stored in direct marketing databases 283, and/or information associated with person B stored proprietary databases (e.g., a central database 284). As such, the system can capture and/or collect information to predict categories, things, events, people, groups, teams, and/or places that can be of interest to the person, and, based on the information, can recommended to topics for discussion (e.g., with that person) to a user. For example, the system can identify that person B has a daughter that plays soccer through an analysis of a Facebook® feed (e.g., the social network feed 281); the system can identify, through an analysis of the direct marketing database 283, that the person B is an outdoor lover; and the system can determine, through marriage records (e.g., stored, for example, in a public database 282), that person B just celebrated a 20th wedding anniversary. These three pieces of information can be used, for example, to build a framework of conversation pieces to use during a meeting event 285 between person A and person B, as illustrated in FIG. 9.

Figure 10:
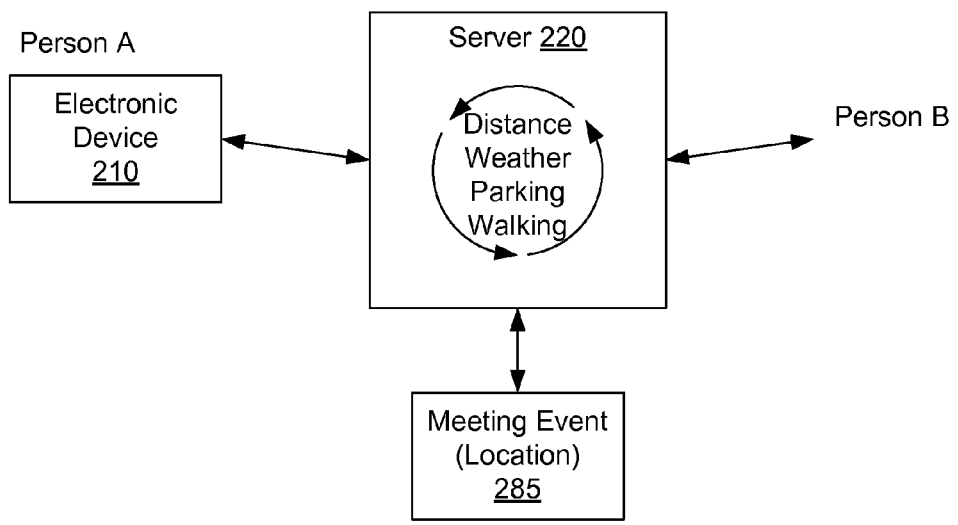
FIG. 10 is a schematic illustration of a server interpreting user location and adding the location information as context to an event, according to an embodiment.

In some instances, automated messages can be provided based on an upcoming event between two or more individuals taking into account a later than planned event time set between two or more people. Furthermore, various variables or a combination that are applicable to the given meeting situation can be considered by, for example, a recommendation module or the like. For example, as shown in FIG. 10, a server 220, which can be substantially similar to or the same as the server 120 of FIG. 2, can estimate a time of arrival for person A based at least in part on a distance from a location of the meeting event 285, weather information, traffic information, parking information, walking information, etc. More specifically, in some instances, a distance of the person A from the meeting event 285 can be determined based at least in part on GPS data (e.g., from an electronic device 210 associated with person A) or other localization technology analysis; traffic information from an internal system (e.g., a module or the like) on the server 220 and/or a feed from an outside party that supplies traffic data (e.g., a maps service or the like); weather conditions at the event location and/or along a route to the event, for example, from the National Weather Service or similar weather data provider; estimated parking time based at least in part on the type of location associated with the event and/or other known information about the specific place (for instance, if a meeting place is located in the mall and the mall is located in a heavily populated area during a prime time of year such as new year, hot summer day, etc.); and estimated time to walk from parking and/or transportation mode exit to the meeting place can be determined based on estimated distance and previous experiences.

These variables can be used to determine the estimated arrival time for an individual and if the person A is going to be "x" minutes late, the server 220 can send an automated message to the other person (e.g., person B) attending the meeting via preferred modality associated with person B. The amount of delay that can activate an alert can be set for a specific event and/or can be a default time period that applies to meetings which can be overridden for specific events. If, for example, the other party is also running late an estimated time of arrival for person A is before an estimated time of arrival of person B (and/or any other person(s) attending the meeting even 285), the server 220 can override the alert and not send a message as to not alert the person B that the person A is running late as well. If multiple people are participating in the meeting event 285, the server 220 can alert only those that are likely to arrive before person A.

Additionally, the server 220 can log the net amount of time it takes to travel to the location of the meeting event 285 as well as the conditions during that day. As a user (e.g., the person A) frequents a given meeting location, the server 220 (e.g., a recommendation module and/or the like) can build a history file to calculate an estimated time based on past experience of the user (e.g., person A). As history data is gathered, the server 220 can use the user's personal information about that destination in addition to the real-time data to produce more accurate estimates of time to travel to the destination. The server 220 can also block time in an event calendar of the user for travel time and update a suggested leaving time based on past history and available real-time information, as described above. For instance, if the server 220 received information that there is an accident, which is causing a back-up, the server 220 (e.g., a module such as the recommendation module 148) can alert the user with a suggestion to leave earlier than previously planned because of the developing circumstances. This can also apply to weather conditions and/or other like situations.

In some instances, the server 220 can also alert the person or persons (e.g., the person B) with whom the user (e.g., the person A) is meeting to convey information of similar conditions that may be creating increased time travel for the user based on his or her location and deliver the information via a preferred modality associated with that person (e.g., person B). User location can be determined by a mobile device with location services and/or based on estimated location based on time of day (e.g., if during work hours use the work address in the contacts). The server 220 can do this for the person B based on contact information associated with the person A (e.g., stored in a database such as the contacts database 156 of FIG. 2).

In addition to a real-time alert for either or both parties being set or sent, the system can also estimate travel time for both parties (e.g., person A and person B) when a meeting invite is sent based on a best guess location starting point. For example, if person A sends a meeting invite to person B, the server can estimate a starting location for person A. The server can prompt the user to confirm if the assumption is correct. If the assumption is incorrect, the user can change the starting location. The same process can be conducted for person B based on the contact information associated with person B (e.g., stored in, for example, a contacts database such as the contacts database 156 of FIG. 2). If person B is using the same server network (e.g., registered with the system), the server can send a prompt to person B to confirm or change the location. Otherwise, if person B is not on the same server network, a message can be sent to person B associated with an invitation to join the network (e.g., register with the system). If so, person B can access, for example, the server to register with the system (e.g., download an application and/or set up an account with the system). If person B declines the invitation, the estimated time can remain as suggested and/or determined by the server.

FIG. 11 is a flowchart illustrating a method 390 of aggregating, correlating, analyzing, and displaying communications included in a conversation, according to an embodiment. The method 390 includes receiving, at a host device via a network, a first signal that is associated with a communication from a first electronic device to a second electronic device, at 391. In some embodiments, the host device can be a server such as, for example, the server 120 described above with reference to FIG. 2. The communication can be sent from the first electronic device via a communication mode (modality) associated with the first electronic device. For example, in some instances, the communication mode can be an email, an instant messenger, an SMS, an MMS, a specific site messenger interfaces, a voicemail, etc. In some embodiments, the host device can be configured to intercept the communication at any suitable point during a transmission. In other embodiments, the communication can be sent directly to the host device.

A user preference associated with a user of a second communication device is verified, at 392. For example, the host device can receive and/or intercept the communication and can compare contact information included in the communication with contact information stored, for example, in a contacts database on the server. Therefore, with the identification of the contact verified, the host device can verify one or more user preferences associated with the contact. For example, the user preference can be associated with a preferred communication mode from the user of the second electronic device. In some instances, the modality of the communication sent from the user of the first electronic device can be different from the preferred communication mode associated with the user of the second electronic device. In such instances, the host device can modify at least a portion of the communication to define the communication in the preferred modality, as described in detail above. In other instances, the modality of the communication sent from the user of the first electronic device can be the same as the preferred modality. In this manner, a second signal associated with the communication is sent to the second electronic device via the preferred communication mode, at 393. Upon receiving the signal, the user of the second electronic device can use, for example, an application (e.g., a software module or the like) associated with the system to access the communication.

The method 390 includes receiving, at the host device and via the network, a third signal, at 394. The third signal is associated with a response to the communication, sent from the second electronic device to the first electronic device. In some embodiments, the third signal can be sent via the same modality as the second signal. In other embodiments, the third signal can be sent via a different modality. That is to say, in some instances, the user of the second electronic device can have a preferred modality for receiving communications that can be different from a preferred modality for sending communications. Moreover, in some instances, the host device can determine (e.g., by querying a database and/or the like) a user preference associated with the user of the first electronic device and if different from the modality associated with the third signal, the host device can modify at least a portion of the response to define the response in the preferred modality of the user of the first electronic device, as described above.

A fourth signal associated with the response is sent to the first electronic device, at 395. In some instances, the fourth signal can also include, for example, instructions to present on a display of the first electronic device, the communication and the response to the communication regardless of a difference in modalities.

In some embodiments, the system can receive, process, analyze, aggregate and/or display information and/or messages in substantially real-time. For example, the system can receive an email message and, in substantially real-time, provide the message to be displayed to the user on an interface (e.g., interface 211 of FIG. 8). For another example, the system can analyze and update information regarding a user based on analysis of social networking feeds (e.g., social network feeds 281 of FIG. 9) in substantially real-time.

Some embodiments described herein relate to devices (e.g., access points, mobile network interfaces) with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although the communications are described above as being generally between a first user and a second user, in some instances, the communications can be between multiple users, a single user and a group of users, two groups of users, multiple groups of users, a user and an entity (e.g., a company, an automated service, etc.), and/or the like. For example, in some instances, a user can define a user preference associated with a preferred modality for sending communication to and/or receiving communications from, a company. In other instances, for example, communications between multiple users (e.g., more than two) working on a similar project can sent and/or received via multiple modalities in a similar manner as described above.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed:

1. A non-transitory processor-readable medium storing code representing instructions to be executed by a processor, the code comprising code to cause the processor to:

receive, from a first electronic device in communication with a network, a first signal, the first signal representing a first data set associated with a communication at a first time, the communication at the first time being associated with a conversation, the first data set received via a first communication mode;

define a second data set, the second data set representing the communication at the first time in a second communication mode;

send, at a second time after the first time and to a second electronic device in communication with the network, a second signal, the second signal associated with the second data set;

receive, from the second electronic device and via the second communication mode, a third signal, the third signal representing a third data set associated with a communication at a third time after the second time, the communication at the third time being associated with the conversation;

send, to the second electronic device, a fourth signal, the fourth signal including an instruction to present, on a display of the second electronic device, the second data set with the third data set;

define a fourth data set, the fourth data set associated with the communication at the first time in a third communication mode, different than second communication mode; and send, at substantially the second time and to the second electronic device, a fifth signal, the fifth signal representing the fourth data set.

2. The non-transitory processor-readable medium of claim 1, wherein the first communication mode and the second communication mode are different communication modes.

3. The non-transitory processor-readable medium of claim 1, wherein the first communication mode and the second communication mode are each one of a short message service (SMS) communication mode, a multimedia message service (MMS) communication mode, an email communication mode, an instant message (IM) communication mode, a chat communication mode, an audio communication mode, or a communication mode associated with a calendar event.

4. The non-transitory processor-readable medium of claim 1, wherein the second communication mode and the second time are each based on a user preference defined by a user of the second electronic device.

5. A method, comprising:

receiving, at a host device via a network, a first signal, the first signal associated with a communication from a first electronic device to a second electronic device;

verifying a user preference associated with a user of the second electronic device, the user preference being associated with a first communication mode;

sending, to the second electronic device and via the first communication mode, a second signal, the second signal associated with the communication;

receiving, at the host device via the network, a third signal, the third signal associated with a response to the communication; and selecting a second communication mode based at least partially on an indication included in the response to the communication; and sending, after the selecting and to the first electronic device via the second communication mode, a fourth signal, the fourth signal associated with the response to the communication.

6. The method of claim 5, wherein the user preference is defined by the user of the second electronic device, an indication of the user preference being stored in a database operably coupled to the host device.

7. The method of claim 5, wherein the user preference is at least partially based on at least one of a communication history, a communication mode usage, a social networking activity, a location, a calendar, a task list, or a time period of frequent communication.

8. The method of claim 5, wherein the receiving the third signal includes receiving the third signal via a third communication mode different from the first communication mode, the third communication mode being selected by the user of the second electronic device.

9. The method of claim 5, further comprising:
sending, to the second electronic device, a fifth signal, the fifth signal indicative of an instruction to present, on a display of the second electronic device, data associated with the communication with data associated with the response to the communication.

10. The method of claim 5, further comprising:
sending, to the second electronic device, a fifth signal, the fifth signal associated with the communication and sent via a third communication mode, different from the first communication mode, in accordance with the user preference.

11. The method of claim 5, wherein the receiving the first signal includes receiving the first signal from the first electronic device via a third communication mode different from the first communication mode.

12. A non-transitory processor-readable medium storing code representing instructions to be executed by a processor, the code comprising code to cause the processor to:
receive a signal associated with an initial instance of data associated with a communication from a user of an electronic device to a user of a set of electronic devices;
select a plurality of communication modes associated with the user of the set of electronic devices;
define a plurality of instances of the data associated with the communication based on the initial instance of the data, each instance of the data from the plurality of instances of the data being associated with a different communication mode from the plurality of communication modes;
send a different signal from a set of signals to each electronic device from the set of electronic devices, each signal from the set of signals associated with a different instance of the data from the plurality of instances of the data and being sent via the communication mode from the plurality of communication modes associated with that instance of the data;
receive a signal associated with an indication that data associated with a first instance of the data from the plurality of instances of the data associated with the communication has been accessed via an electronic device from the set of electronic devices; and
send a signal, including an instruction to remove a notification associated with a second instance of the data from the plurality of instances of the data and to indicate that the first instance of the data has been received at the electronic device from the set of electronic device, to at least one electronic device from the set electronic devices to remove the notification a associated with the second instance of the data from the plurality of instances of the data.

13. The non-transitory processor-readable medium of claim 12, wherein the plurality of communication modes includes at least one of a short message service (SMS) communication mode, a multimedia message service (MMS) communication mode, an email communication mode, an instant message (IM) communication mode, a chat communication mode, an audio communication mode, or a communication mode associated with a calendar event.

14. The non-transitory processor-readable medium of claim 12, wherein the code to cause the processor to receive the signal associated with the initial instance of data associated with the communication from the user of the first electronic device to the user of the set of electronic devices includes code to cause the processor to receive the signal from the user of the first electronic device via a communication mode different from the plurality of communication modes associated with the user of the set of electronic devices.

15. The non-transitory processor-readable medium of claim 12, wherein the code to cause the processor to select the plurality of communication modes associated with the user of the set of electronic devices includes code to cause the processor to select the plurality of communication modes based at least in part on a user preference.

16. The non-transitory processor-readable medium of claim 12, wherein the code to cause the processor to send the signal to remove the notification includes code to cause the processor to send the signal to remove the notification based at least in part on a user preference defined by the user of the set of electronic devices.

* * * * *

UNITED STATES PATENT AND TRADEMARK OFFICE
CERTIFICATE OF CORRECTION

| | |
|---|---|
| PATENT NO. | : 9,672,270 B2 |
| APPLICATION NO. | : 14/025354 |
| DATED | : June 6, 2017 |
| INVENTOR(S) | : Brandon Christian White et al. |

Page 1 of 1

It is certified that error appears in the above-identified patent and that said Letters Patent is hereby corrected as shown below:

Column 26, Line 60 (Claim 5, Line 13):
After "communication;" please delete "and"

Column 28, Line 15 (Claim 12, Line 33):
After "notification" please delete "a"

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*